(12) United States Patent
Sissom

(10) Patent No.: US 7,336,409 B2
(45) Date of Patent: Feb. 26, 2008

(54) MINIATURE FLEXURE BASED SCANNERS FOR ANGLE MULTIPLEXING

(75) Inventor: Bradley J. Sissom, Boulder, CO (US)

(73) Assignees: Inphase Technologies, Inc., Longmont, CO (US); Nintendo Co., Ltd., Kyoto (JP)

( * ) Notice: Subject to any disclaimer, the term of this patent is extended or adjusted under 35 U.S.C. 154(b) by 0 days.

(21) Appl. No.: 11/714,126

(22) Filed: Mar. 6, 2007

(65) Prior Publication Data

US 2007/0206252 A1    Sep. 6, 2007

Related U.S. Application Data

(60) Provisional application No. 60/778,935, filed on Mar. 6, 2006.

(51) Int. Cl.
*G02B 26/08* (2006.01)
*A47G 1/24* (2006.01)

(52) U.S. Cl. ............ 359/225; 359/198; 359/224; 359/871; 248/479

(58) Field of Classification Search ............ None
See application file for complete search history.

(56) References Cited

U.S. PATENT DOCUMENTS

| | | | |
|---|---|---|---|
| 4,732,440 A | 3/1988 | Gadhok | |
| 5,438,439 A | 8/1995 | Mok et al. | |
| 5,529,277 A | 6/1996 | Ostaszewski | |
| 5,815,302 A * | 9/1998 | McVey et al. | 359/214 |
| 5,978,112 A | 11/1999 | Psaltis et al. | |
| 6,103,454 A | 8/2000 | Dhar et al. | |
| 6,275,319 B1 | 8/2001 | Gadhok | |
| 6,304,359 B1 | 10/2001 | Gadhok | |
| 6,482,551 B1 | 11/2002 | Dhar et al. | |
| 6,650,447 B2 | 11/2003 | Curtis et al. | |
| 6,743,552 B2 | 6/2004 | Setthachayanon et al. | |
| 6,765,061 B2 | 7/2004 | Dhar et al. | |
| 6,780,546 B2 | 8/2004 | Trentler et al. | |
| 6,788,443 B2 | 9/2004 | Ayres et al. | |
| 7,149,015 B2 | 12/2006 | Hoogland et al. | |
| 2002/0073632 A1* | 6/2002 | Huffman | 52/29 |
| 2003/0206320 A1 | 11/2003 | Cole et al. | |
| 2004/0027625 A1 | 2/2004 | Trentler et al. | |

OTHER PUBLICATIONS

McLeod et al. "Micro-Holographic Multi-Layer Optical Disk Data Storage," *International Symposium on Optical Memory and Optical Data Storage* (Jul. 2005).
Psaltis et al., "Holographic Memories," *Scientific American*, Nov. 1995.

* cited by examiner

*Primary Examiner*—James Phan
(74) *Attorney, Agent, or Firm*—Jagtiani + Guttag

(57) ABSTRACT

The present invention provides a spatial flexure comprising: a base section; an end section; and an intermediate laterally contracting and expanding section connecting the base and end sections, whereby when the intermediate section laterally expands or contracts, the end section pivots downwardly or upwardly. The present invention further provides a spatial flexure scanner comprising: a base section; a scanning beam reflective section; an intermediate laterally contracting and expanding section connecting the base and reflective sections; an actuator associated with the base section; a scanning beam reflective mirror connected to the reflective section; means connecting the actuator and the reflective member for causing lateral contraction or expansion of the intermediate section in response to the actuator, whereby when the intermediate section laterally expands or contracts, the reflective section pivots downwardly or upwardly.

46 Claims, 7 Drawing Sheets

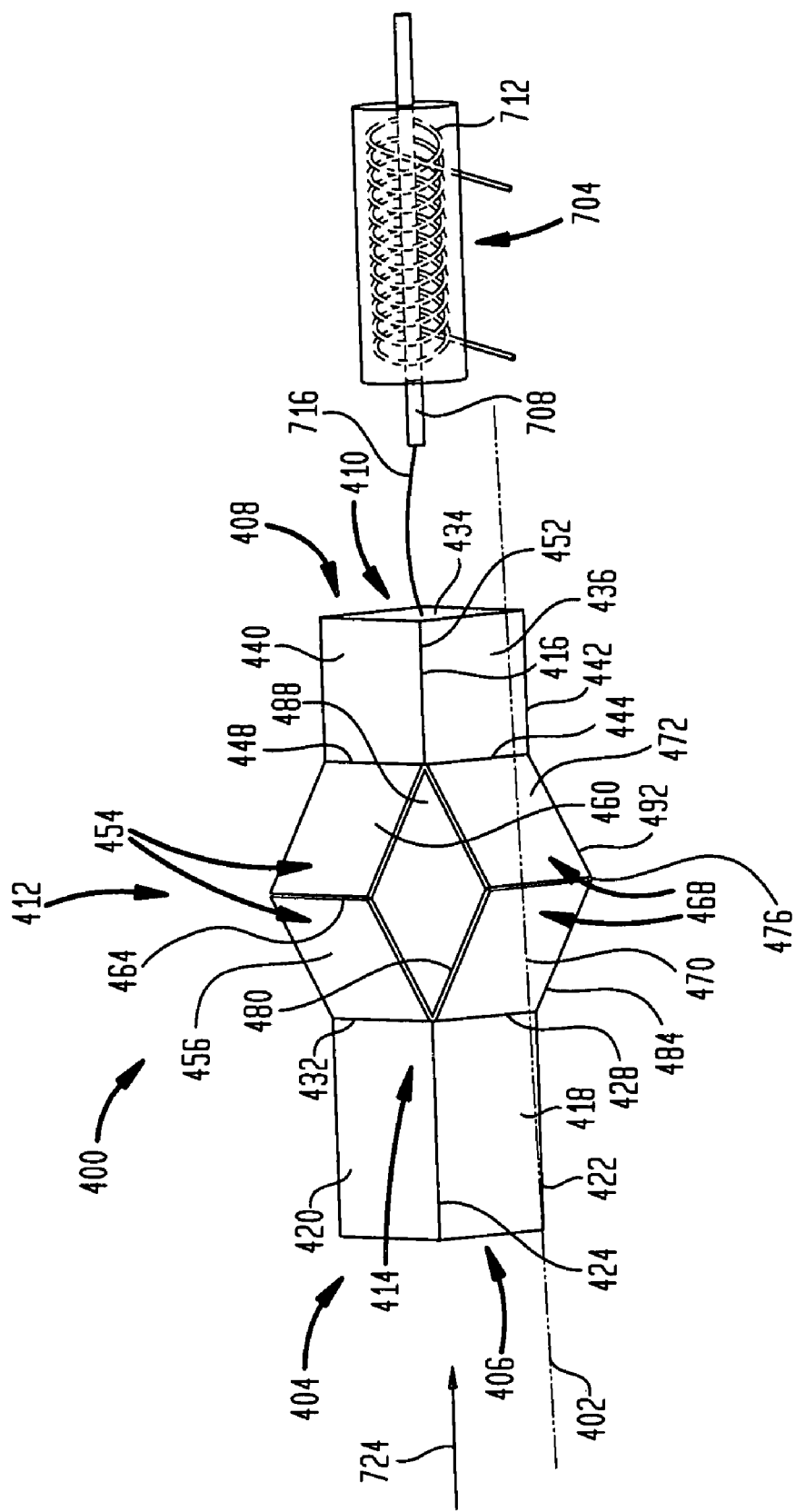

US 7,336,409 B2

MINIATURE FLEXURE BASED SCANNERS FOR ANGLE MULTIPLEXING

CROSS-REFERENCE TO RELATED APPLICATIONS

This application makes reference to and claims the priority date of the following U.S. Provisional Patent Application: U.S. Provisional App. No. No. 60/778,935 entitled "Miniature Flexure Based Scanners for Angle Multiplexing," filed Mar. 6, 2006. The entire disclosure and contents of the above application is hereby incorporated by reference.

STATEMENT OF JOINT RESEARCH AGREEMENT

In compliance with 37 C.F.R. § 1.71(g) (1), disclosure is herein made that the claimed invention was made pursuant to a Joint Research Agreement as defined in 35 U.S.C. 103 (c) (3), that was in effect on or before the date the claimed invention was made, and as a result of activities undertaken within the scope of the Joint Research Agreement, by or on the behalf of Nintendo Co., Ltd. and InPhase Technologies, Inc.

BACKGROUND

1. Field of the Invention

The present invention broadly relates to generally to a device comprising a spatial flexure for a scanner used in angle multiplexing of holographic data. The present invention further broadly relates to a spatial flexure scanner for use in angle multiplexing of holographic data.

2. Related Art

Developers of information storage devices and methods continue to seek increased storage capacity. As part of this development, holographic memory systems have been suggested as alternatives to conventional memory devices. Holographic memory systems may be designed to record data as one bit of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimensional array commonly referred to as a "page-wise" memory system. Page-wise memory systems may involve the storage and readout of an entire two-dimensional representation, e.g., a page of data. Typically, recording light passes through a two-dimensional array of low and high transparency areas representing data, and the system stores, in three dimensions, the pages of data holographically as patterns of varying refractive index imprinted into a storage medium. See Psaltis et al., "Holographic Memories," *Scientific American*, November 1995, where holographic systems are discussed generally, including page-wise memory systems.

Holographic data storage systems may perform a data write (also referred to as a data record or data store operation, simply "write" operation herein) by combining two coherent light beams, such as laser beams, at a particular point within the storage medium. Specifically, a data-encoded light beam may be combined with a reference light beam to create an interference pattern in the holographic storage medium. The pattern created by the interference of the data beam and the reference beam forms a hologram which may then be recorded in the holographic medium. If the data-bearing beam is encoded by passing the data beam through, for example, a spatial light modulator (SLM), the hologram(s) may be recorded in the holographic medium.

Holographically-stored data may then be retrieved from the holographic data storage system by performing a read (or reconstruction) of the stored data. The read operation may be performed by projecting a reconstruction or probe beam into the storage medium at the same angle, wavelength, phase, position, etc., as the reference beam used to record the data, or compensated equivalents thereof. The hologram and the reference beam interact to reconstruct the data beam.

A technique for increasing data storage capacity is by multiplexing holograms. Multiplexing holograms involves storing multiple holograms in the holographic storage medium, often in the same volume or nearly the same volume of the medium. Multiplexing may carried out by varying an angle, wavelength, phase code, etc., in recording and then later reading out the recorded holograms. Many of these methods rely on a holographic phenomenon known as the Bragg effect to separate the holograms even though they are physically located within the same volume of media. Other multiplexing methods such as shift and, to some extent correlation, use the Bragg effect and relative motion of the media and input laser beams to overlap multiple holograms in the same volume of the media.

In angle multiplexing, multiple holograms may be stored in the same volume of the holographic storage medium by varying the angle of the reference beam during recording. For example, data pages may be recorded in the holographic storage medium at many angles, the exhausting the dynamic range or "address space" of a given volume of the medium. Each location in the "address space" (or each data page) corresponds to the angle of a reference beam. During recording, the reference beam scans through many discrete angles as data pages are written. Conversely, during readout, a conjugate reference beam (sometimes referred to as a "probe beam") may probe each data page at its corresponding angle. The scanner may be used for either recording or readout.

FIG. 1 represents an illustrative readout scanning carried out using a conventional galvo scanner (as the readout scanner), indicated generally as 100, of data recorded in the holographic storage medium by angle multiplexing. Readout scanner 100 is shown here with a holographic storage medium 104 which has an upper surface 106, a reflective backing 108 to facilitate miniaturization, and a midpoint 110. The incoming readout reference beam 112 is represented by three lines corresponding to the top of the beam (line 112-1), middle of the beam (line 112-2), and the bottom of the beam (line 112-3). Scan 116 represents the start angle, scan 120 the middle angle, and scan 124 the end angle of the dynamic range. The optical center of rotation ("CR") is indicated by arrow 132. Also shown in FIG. 1 is a first mirror 140 which may be adjusted or pivoted to different angles (e.g., represented by positions 140-1, 140-2 and 140-3), and a second mirror 148 which may also be adjusted or pivoted to different angles (e.g., represented by positions 148-1, 148-2 and 148-3). Lines 116-1, 116-2 and 116-3 represent the respective reflections of top 112-1, middle 112-2 and bottom 112-3 of beam 112 when the first and second mirrors are at positions 140-3 and 148-3. Similarly lines 120-1, 120-2 and 120-3 represent the respective reflections of top 112-1, middle 112-2 and bottom 112-3 of beam 112 when the first and second mirrors are at positions 140-2 and 148-2, while lines 124-1, 124-2 and 124-3 represent the respective reflections of top 112-1, middle 112-2 and bottom 112-3 of beam 112 when the first and second mirrors are at positions 140-1 and 148-1. As further shown in FIG. 1, optical CR 132 represents, at the intersection of midpoint 110 and lines 116-2, 120-2 and 124-2, both the center of the reference beam rotation, as well as the center of the hologram volume, by the readout scanner 100. Recording scanners that have a stationary CR at the hologram centroid minimize the size of each non-overlapping recording location and thus make best use of the dynamic range of the medium. During readout such scanners may minimize cross-talk from holograms at different addresses. Scanners with a stationary CR also minimize the required size of the reference beam and thus minimize power required for a given energy density.

SUMMARY

According to a first broad aspect of the present invention, there is provided a device comprising a spatial flexure comprising.
- a base section having:
  - an upper edge; and
  - a side edge transverse to the upper edge;
- an end section having;
  - an upper panel having a first edge, a second edge laterally spaced from the first edge, and a third edge connecting the first and second edges; and
  - a side panel having first side edge, a second side edge laterally spaced from the first side edge and having an upper edge connecting the first and second side edges;
  - the third edge of upper panel and the upper edge of side panel forming a common edge; and
- an intermediate laterally contracting and expanding section connecting the base and end sections and having:
  - an upper segment comprising:
    - an first generally rectangular-shaped panel having a first edge connected to the upper edge of the base section for articulated movement about a first longitudinal axis; and
    - a second generally rectangular-shaped panel having a first edge connected to the first edge of the end section for articulated movement about a second longitudinal axis; the first and second rectangular-shaped panels each having a common second upper edge connected for articulated movement about a third longitudinal axis defined by the common second edge such that the common second edge moves outwardly when the intermediate section laterally contracts and inwardly when the intermediate section laterally expands;
  - a side segment comprising:
    - a first quadrilateral-shaped panel having:
      - a lower edge;
      - an upper edge different in length from the lower edge of the first t quadrilateral-shaped panel;
      - a side edge connected to the upper and lower edges of the first quadrilateral-shaped panel, and connected to the side edge of the base section for articulated movement about a fourth longitudinal axis; and
    - a second quadrilateral-shaped panel having:
      - a lower edge;
      - an upper edge different in length from the lower edge of the second quadrilateral-shaped panel; and
      - a first side edge connected to the upper and lower edges of the second quadrilateral-shaped panel, and connected to the side edge of the end section for articulated movement about a fifth longitudinal axis;
    the first and second quadrilateral-shaped panels having a common second side edge connected to the respective lower and upper edges of the quadrilateral-shaped panels for articulated movement about a sixth longitudinal axis defined by the common second side edge such that the common second side edge moves outwardly when the intermediate section laterally contracts and inwardly when the intermediate laterally expands;
  - whereby: (1) when the intermediate section laterally expands, the end section pivots one of downwardly and upwardly; and (2) when the intermediate section laterally contracts, the reflective section pivots the other of downwardly and upwardly.

According to a second broad aspect of the present invention, there is provided a device comprising a spatial flexure scanner comprising:
- a base section having:
  - an upper edge; and
  - a side edge transverse to the upper edge; and
- a scanning beam reflective section having;
  - an upper edge; and
  - a side edge transverse to the upper edge of the reflective section; and
- an intermediate laterally contracting and expanding section connecting the base and reflective sections and having:
  - an upper segment comprising:
    - a first generally rectangular-shaped panel having a first edge connected to the upper edge of the base section for articulated movement about a first longitudinal axis; and
    - a second generally rectangular-shaped panel having a first upper edge connected to the upper edge of the reflective section for articulated movement about a second longitudinal axis;
    the first and second rectangular-shaped panels each having a common second upper edge connected for articulated movement about a third longitudinal axis defined by the common second edge such that the common second edge moves outwardly when the intermediate section laterally contracts and inwardly when the intermediate section laterally expands;
  - a side segment comprising:
    - a first generally quadrilateral-shaped panel having:
      - a lower edge;
      - an upper edge different in length from the lower edge of the first quadrilateral-shaped panel;
      - a side edge connected to the upper and lower edges of the first quadrilateral-shaped panel, and connected to the side edge of the base section for articulated movement about a fourth longitudinal axis; and
    - a second generally quadrilateral-shaped panel having:
      - a lower edge;
      - an upper edge different in length from the lower edge of the second quadrilateral-shaped panel; and
      - a first side edge connected to the upper and lower edges of the second quadrilateral-shaped panel, and connected to the first side edge of the reflective section for articulated movement about a fifth longitudinal axis;

the first and second quadrilateral-shaped panels having a common second side edge connected to the respective lower first side and second upper edges of the quadrilateral-shaped panels for articulated movement about a sixth longitudinal axis defined by the second common side edge such that the common second side edge moves outwardly when the intermediate section laterally contracts and inwardly when the intermediate section laterally expands;

an actuator associated with the spatial flexure;

a scanning beam reflective member connected to the second edge of the upper panel and second side edge of the side panel of the reflective section;

means connecting the actuator and the reflective member for causing lateral contraction or expansion of the intermediate section in response to the actuator;

whereby: (1) when the intermediate section laterally expands, the reflective section pivots one of downwardly and upwardly; and (2) when the intermediate section laterally contracts, the reflective section pivots the other of downwardly and upwardly.

According to a third broad aspect of the present invention, there is provided a device comprising a spatial flexure comprising.

a base section having:
an upper edge; and
a side edge transverse to the upper edge;

an end section having;
an upper panel having a first edge, a second edge laterally spaced from the first edge, and a third edge connecting the first and second edges; and
a side panel having first side edge, a second side edge laterally spaced from the first side edge and having an upper edge connecting the first and second side edges;
the third edge of upper panel and the upper edge of side panel forming a common edge; and an intermediate laterally contracting and expanding section connecting the base and end sections and having:
an upper segment comprising:
an first generally rectangular-shaped panel having a first edge connected to the upper edge of the base section for articulated movement about a first longitudinal axis; and
a second generally rectangular-shaped panel having a first edge connected to the first edge of the end section for articulated movement about a second longitudinal axis;
the first and second rectangular-shaped panels each having a common second upper edge connected for articulated movement about a third longitudinal axis defined by the common second edge such that the common second edge moves outwardly when the intermediate section laterally contracts and inwardly when the intermediate section laterally expands;

a side segment comprising:
a first trapezoidal-shaped panel having:
a lower edge;
an upper edge different in length from the lower edge of the first quadrilateral-shaped panel;
a side edge connected to the upper and lower edges of the first trapezoidal-shaped panel, and connected to the side edge of the base section for articulated movement about a fourth longitudinal axis; and
a second generally trapezoidal-shaped panels having:
a lower edge;
an upper edge different in length from the lower edge of the second trapezoidal-shaped panel; and
a first side edge connected to the upper and lower edges of the second trapezoidal-shaped panel, and connected to the side edge of the end section for articulated movement about a fifth longitudinal axis;
the first and second trapezoidal-shaped panels having a common second side edge connected to the respective lower and upper edges of the trapezoidal-shaped panels for articulated movement about a sixth longitudinal axis defined by the common second side edge such that the common second side edge moves outwardly when the intermediate section laterally contracts and inwardly when the intermediate section laterally expands;

whereby: (1) when the intermediate section laterally expands, the end section pivots one of downwardly and upwardly; and (2) when the intermediate section laterally contracts, the end section pivots the other of downwardly and upwardly.

According to a fourth broad aspect of the present invention, there is provided a device comprising a spatial flexure scanner comprising:
a base section having:
an upper edge; and
a side edge transverse to the upper edge; and
a scanning beam reflective section having;
an upper edge; and
a side edge transverse to the upper edge of the reflective section; and
an intermediate laterally expanding and contracting section connecting the base and reflective sections and having:
an upper segment comprising:
an first generally square-shaped panel having a first edge connected to the upper edge of the base section for articulated movement about a first longitudinal axis; and
a second generally square-shaped panel having a first upper edge connected to the upper edge of the reflective section for articulated movement about a second longitudinal axis;
the first and second square-shaped panels each having a common second upper edge connected for articulated movement about a third longitudinal axis defined by the common second edge such that the common second edge moves outwardly when the intermediate section laterally contracts and inwardly when the intermediate section laterally expands;

a side segment comprising:
a first generally trapezoidal-shaped panel having:
a lower edge;
an upper edge longer in length than the lower edge of the first trapezoidal-shaped panel;
a side edge connected to the upper and lower edges of the first trapezoidal-shaped panel, and connected to the side edge of the base section for articulated movement about a fourth longitudinal axis; and a second generally trapezoidal-shaped panel having:
   a lower edge;
   an upper edge longer in length than the lower edge of the second trapezoidal-shaped panel; and
   a first side edge connected to the upper and lower edges of the second trapezoidal-shaped panel, and connected to the first side edge of the reflective section for articulated movement about a fifth longitudinal axis;
the first and second trapezoidal-shaped panels having a common second side edge connected to the respective lower first side and second upper edges of the trapezoidal-shaped panels for articulated movement about a sixth longitudinal axis defined by the second common side edge such that the common second side edge moves outwardly when the intermediate section laterally contracts and inwardly when the intermediate section laterally expands;
an actuator associated with the base section;
a scanning beam reflective member connected to second edge of the upper panel and second side edge of the side panel of the reflective section;
means connecting the actuator and the reflective member for causing lateral contraction or expansion of the intermediate section in response to the actuator;
whereby: (1) when the intermediate section laterally expands, the reflective section pivots downwardly; and (2) when the intermediate section laterally contracts, the reflective section pivots upwardly.

BRIEF DESCRIPTION OF THE DRAWINGS

The invention will be described in conjunction with the accompanying drawings, in which:

FIG. 7 represents a view similar to FIG. 3 of the spatial flexure scanner but with an external actuator.

DETAILED DESCRIPTION

Figure 1:
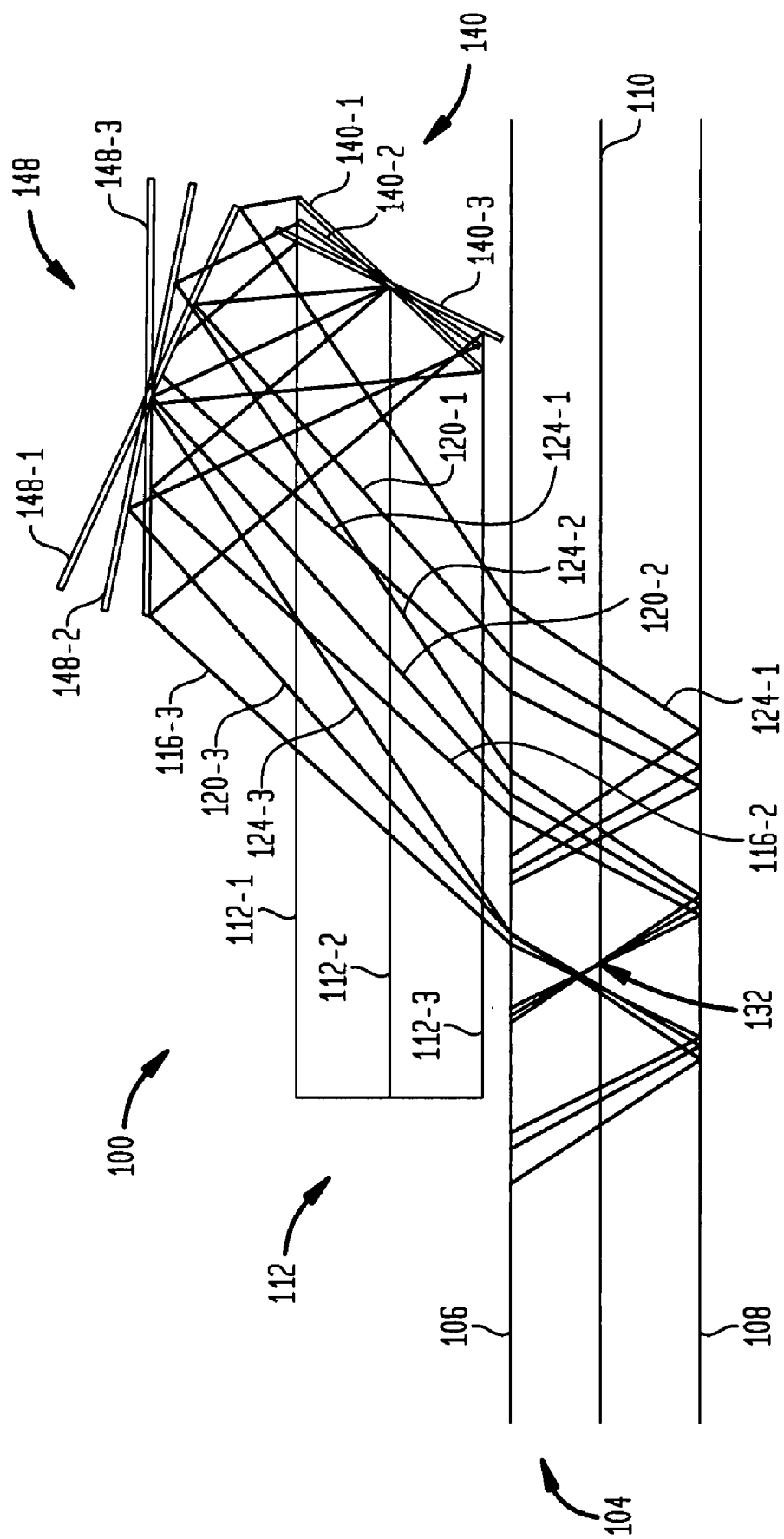
FIG. 1 represents an illustrative readout scanning carried out using a conventional galvo scanner (as the readout scanner) of data recorded in the holographic storage medium by angle multiplexing.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "above", "below", "left", "right", "horizontal", "vertical", etc. are merely used for convenience in describing the various embodiments of the present invention. The embodiments of the present invention may be oriented in various ways. For example, the embodiments shown in FIGS. 3 through 6 may be flipped over, rotated by 90° in any direction, etc.

For the purposes of the present invention, the term "laser" refers to conventional lasers, as well as laser diodes (LDs).

For the purposes of the present invention, the term "light source" refers to any source of electromagnetic radiation of any wavelength, for example, from a laser, etc. Suitable light sources for use in embodiments of the present invention include, but are not limited to, those obtained by conventional laser sources, e.g., the blue and green lines of $Ar^+$ (458, 488, 514 nm) and He—Cd lasers (442 nm), the green line of frequency doubled YAG lasers (532 nm), and the red lines of He—Ne (633 nm), $Kr^+$ lasers (647 and 676 nm), and various laser diodes (LDs) (e.g., emitting light having wavelengths of from 290 to 900 nm).

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded, the signal beam may be encoded with a data modulator, e.g., a spatial light modulator, etc.

For the purposes of the present invention, the term "holographic recording" refers to the act of recording a hologram in a holographic storage medium.

For the purposes of the present invention, the term "multiplexing holograms" refers to recording, storing, etc., a plurality of holograms in the same volume or nearly the same volume of the holographic storage medium by varying a recording parameter(s) including, but not limited to, angle, wavelength, phase code, shift, correlation, peristrophic, etc. The multiplexed holograms that are recorded, stored, etc., may be read, retrieved, reconstructed, etc., by using the same recording parameter(s) used to record, store, etc., the respective holograms.

For the purposes of the present invention, the term "holographic storage medium" refers to a component, material, etc., that is capable of recording and storing, in three dimensions (i.e., the X, Y and Z dimensions), one or more holograms as one or more pages as patterns of varying refractive index imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320 (Cole et al), published Nov. 6, 2003, and U.S. Patent Application No. 2004-0027625 (Trentler et al.), published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data (i.e., two-dimensional assembly of data), one or more pictures, etc., to be recorded in a holographic storage medium.

For the purposes of the present invention, the term "recording light" refers to a light source used to record into a holographic storage medium. The spatial light intensity pattern of the recording light is what is recorded.

For the purposes of the present invention, the term "recording data" refers to storing or writing holographic data in a holographic medium.

For the purposes of the present invention, the term "reading data" refers to retrieving, recovering, or reconstructing holographic data stored in a holographic medium.

For the purposes of the present invention, the term "X-Y plane" typically refers to the plane defined by holographic medium that encompasses the X and Y linear directions or dimensions. The X and Y linear directions or dimensions are typically referred to herein, respectively, as the dimensions known as length (i.e., the X-dimension) and width (i.e., the Y-dimension).

For the purposes of the present invention, the terms "Z-direction" and "Z-dimension" refer interchangeably to the linear dimension or direction perpendicular to the X-Y plane, and is typically referred to herein as the linear dimension known as thickness.

For the purposes of the present invention, the term "data modulator" refers to any device that is capable of optically representing data in one or two-dimensions from a signal beam.

For the purposes of the present invention, the term "spatial light modulator" (SLM) refers to a data modulator device that is an electronically controlled, active optical element.

For the purposes of the present invention, the term "refractive index profile" refers to a two-dimensional (X, Y) mapping of the refractive index pattern recorded in a holographic storage medium.

For the purposes of the present invention, the term "data beam" refers to a recording beam containing a data signal. As used herein, the term "data modulated beam" refers to a data beam that has been modulated by a modulator such as a spatial light modulator (SLM).

For the purposes of the present invention, the terms "dynamic range" or "M#" relate to an intrinsic property of a holographic medium and refer to the total response of that medium when portioned among the one or more holograms recorded in a common volume and related to the index change and thickness of that medium. See Shelby, "Media Requirements for Digital Holographic Data Storage," Holographic Data Storage, Section 1.3 (Coufal, Psaltis, Sincerbox Eds. 2003).

For the purposes of the present invention, the term "transmission" refers to transmission of a light beam from one component, element, article, etc., to another component, element, article, etc.

For the purposes of the present invention, the term "scanner" refers to a steering device for a light beam used to read, analyze, etc., images recorded in a holographic storage medium.

For the purposes of the present invention, the term "CR" refers to center of rotation. For example, a mechanical center of rotation corresponds to a mechanical axis. By contrast, an optical center of rotation refers to the common intersection of all scan angles.

For the purposes of the present invention, the term "degrees of freedom" refers to the number of constraints required to describe a motion or movement mechanically or mathematically.

For the purposes of the present invention, the term "two degrees of freedom" refers to systems, devices, etc., having two constraints.

For the purposes of the present invention, the term "pivotal movement" refers to angular movement upwardly or downwardly relative to a given linear longitudinal axis.

For the purposes of the present invention, the term "translate" refers to lateral or linear motion or movement along a linear longitudinal axis.

For the purposes of the present invention, the term "rotary galvo actuator" refers to galvanometer, e.g., a mirror which is rotated, pivoted, etc., by a motor, such as, for example, an electric motor.

For the purposes of the present invention, the term "master galvo" refers to a galvo assigned to an independent variable of a two degree of freedom constraint equation.

For the purposes of the present invention, the term "slave galvo" refers to a galvo assigned to a dependent variable of a two degree of freedom constraint equation.

For the purposes of the present invention, the term "control rule" refers to a two degree of freedom constraint equation.

For the purposes of the present invention, the term "scanner height" refers to the vertical height of the scanner above the upper surface of the holographic medium.

For the purposes of the present invention, the term "stationary CR scan" refers to a scan motion or movement with a common intersection point at all scan angles. The CR may be chosen to be at an advantageous location such as at the center of the hologram volume.

For the purposes of the present invention, the term "idealized motion" refers to motion that reflects no or minimal mechanical errors.

For the purposes of the present invention, the terms "motion" or "movement" refer interchangeably to any form of motion or movement, for example, linear movement, pivotal movement, etc.

For the purposes of the present invention, the term "flexure" refers to a device, article, mechanism, etc., that is sufficiently flexible to bend deterministically and stay within the elastic limits of the material comprising same.

For the purposes of the present invention, the term "monolithic flexure" refers to a flexure which comprises one-piece, e.g., is integral.

For the purposes of the present invention, the term "spatial flexure" refers to a flexure which contracts and expands laterally along a linear longitudinal axis because of plurality sections, panels, components, etc., which comprise same and which move out of or transverse to the plane of motion or movement to cause such lateral contraction or expansion.

For the purposes of the present invention, the term "Sarrus flexure" refers to a flexure which comprises a plurality of sections, components, panels, etc., to form a linear spatial flexure which contracts or expands laterally so as to move only along a linear longitudinal axis.

For the purposes of the present invention, the term "two-dimensional spatial flexure scanner" refers to a spatial flexure scanner which not only contracts and expands laterally along a linear longitudinal axis, but also pivots downwardly and upwardly relative this linear longitudinal axis, i.e., the scan mirror of the spatial flexure scanner moves in two-dimensions.

For the purposes of the present invention, the term "quadrilateral" refers to a section, panel, etc., having four sides or edges, and which may include, without limitation, rectangles, squares, trapezoids, trapeziums, etc.

For the purposes of the present invention, the term "mirror tilt" refers to the degree or angle that the scanning mirror is pivoted relative to a linear longitudinal axis.

For the purposes of the present invention, the terms "pivot angle" and "degree of pivoting" refer interchangeably to the angular degree to which the reflective section of the flexure is pivoted relative to the linear longitudinal axis.

For the purposes of the present invention, the terms "transverse motion" or "transverse movement" refer interchangeably to motion or movement transverse with respect to the plane of the principal motion or movement.

For the purposes of the present invention, the term "actuator" refers to a device (e.g., electromechanical device, such as a solenoid, piezo actuator) that causes, imparts, etc., motion, movement, etc.

For the purposes of the present invention, the term "linear actuator" refers to an actuator which causes, imparts, etc., linear motion. Suitable linear actuators may include, solenoids, piezo actuators, lead screw actuators, linear steppers, electrostrictive actuators (also referred to a muscle wire), shaped memory alloy (e.g., nitinol) actuators, etc.

For the purposes of the present invention, the term "voice coil" refers to a solenoid-type actuator.

For the purposes of the present invention, the term "elastic deflection" refers to a deflection that does not exceed the elastic limit of the material.

For the purposes of the present invention, the term "bandwidth" refers to a measure of the frequency range, which is typically measured in hertz.

For the purposes of the present invention, the term "settling time" refers to the time required for actuated motion or movement to stop completely. For example, at the end of the stroke of a solenoid, there may be some transient dithering motion whose amplitude decays over time because of damping in the flexure. In such an instance, the settling time would be the time required for such motion to decay completely.

For the purposes of the present invention, the term "hinged pleat" refers to a unitary or integral connecting or joining linkage or edge between two panels, sections, etc., which provides an articulated connection along a common edge. As used herein, a hinged pleat may include a longer radius bend that connects two panels, sections, etc.

For the purposes of the present invention, the term "deflection axis" refers to the several axes about which an articulated connecting edge (e.g., a hinged pleat) may bend.

Description

In order to keep the CR stationary during the scan of data recorded in a holographic storage medium by angle multiplexing, the probe (scanning) beam used in the scanning should have two degrees of freedom, e.g., should be able to pivot, as well as translate. Such rotation and translation of the scanning beam requires two degrees of freedom, for example, such as may be provided by two rotary galvo actuators. But these two degrees of freedom are not independent in these two rotary galvo actuators, in that the angle of the "slave galvo" may be constrained to the angle of the "master galvo" through the use of a control rule that is sufficient to keep the CR stationary.

Figure 2:
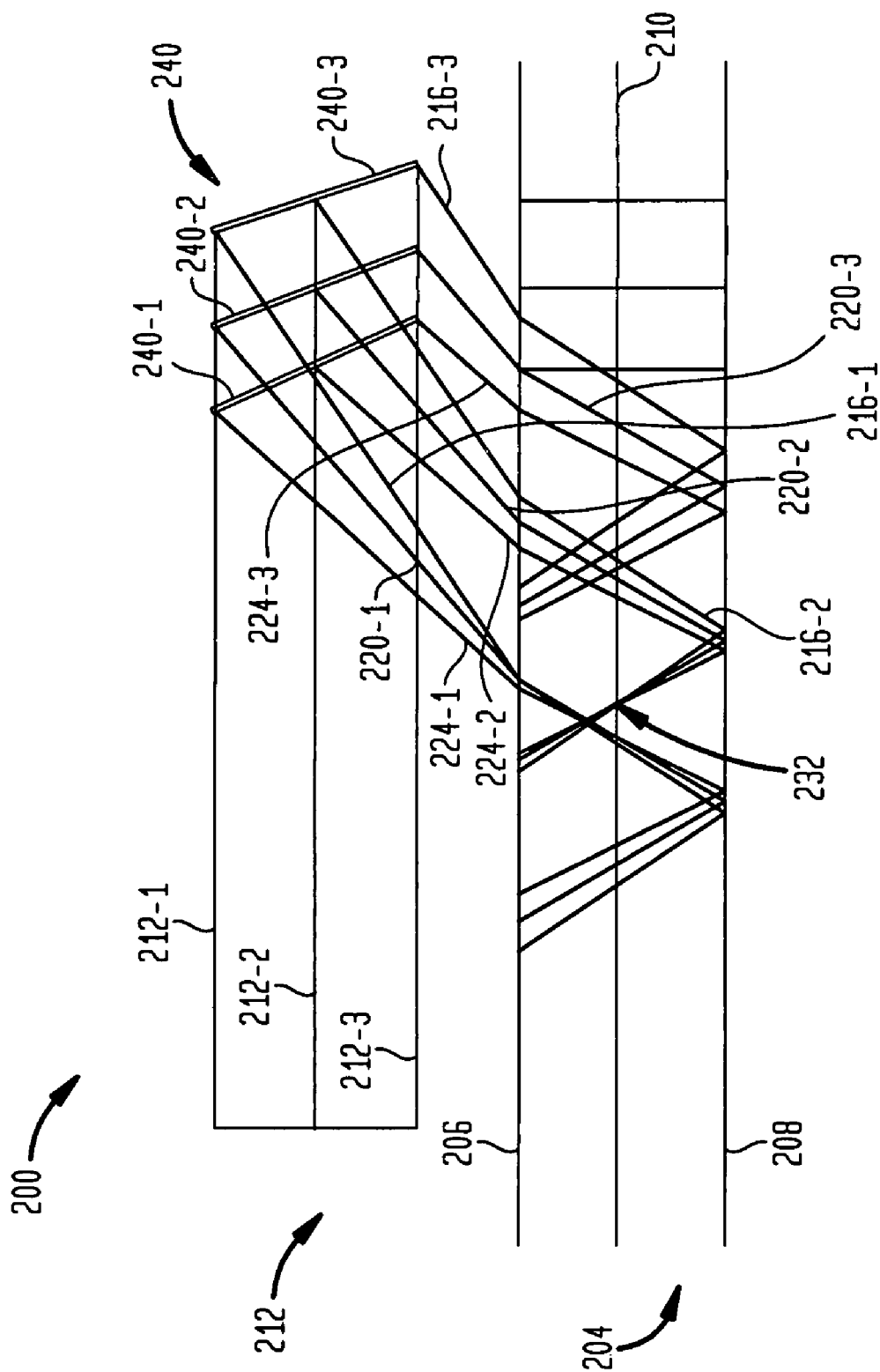
FIG. 2 illustrates an idealized 14 degree scanner system using a single mirror that may both translate and pivot.

FIG. 2 illustrates an idealized 14 degree scanner system (i.e., a scanner whose beam may be pivoted to an angle of up to at least about 14 degrees), indicated generally as 200, using a single scan mirror 240 that may both translate and pivot. An idealized scanner system 200 is shown in FIG. 2 with a holographic storage medium 204 which has an upper surface 206, a reflective backing 208 to facilitate miniaturization, and a midpoint 210. The incoming readout reference beam 212 is represented by three positions corresponding to the top of the beam (line 212-1), the middle of the beam (line 212-2), and the bottom of the beam (line 212-3). Scan 216 represents the start angle, scan 220 the middle angle and scan 224 the end angle of the dynamic range. The optical center of rotation ("CR") is indicated by arrow. Also shown in FIG. 2, mirror 240 which may be adjusted or translated to three different angles (e.g., represented by positions 240-1, 240-2 and 240-3). Lines 216-1, 216-2 and 216-3 represent the respective reflections of top 212-1, middle 212-2 and bottom 212-3 of beam 212 when mirror 240 is at positions 240-3. Similarly lines 220-1, 220-2 and 220-3 represent the respective reflections of top 212-1, middle 212-2 and bottom 212-3 of beam 212 when mirror 240 is at position 240-2, while lines 224-1, 224-2 and 224-3 represent the respective reflections of top 212-1, middle 212-2 and bottom 212-3 of beam 212 when mirror 240 is at positions 240-1. As further shown in FIG. 1, the optical CR represents, at the intersection of midpoint 210 and lines 216-2, 220-2 and 224-2 both the center of the reference beam rotation, as well as the center of the hologram volume, by scanner 200.

In embodiments of the present invention, the spatial flexure differs from prior linear spatial flexures or linkages (also known as Sarrus linkages). In a traditional Sarrus linkage, there is, for example, a base section, an end section, and an intermediate section connecting the base and end sections. The intermediate section includes an the upper segment comprising two square-shaped panels connected by hinges (thus permitting articulation) and a side segment also comprising two square-shaped panels connected by hinges (also permitting articulation). The upper and side segments of the intermediate section are also connected to the base and end sections by hinges (also permitting articulation). Because each of the four panels of the upper and side segments are square-shaped, a Sarrus linkage provides only lateral translational movement along a linear longitudinal axis (i.e., along a straight line) as the intermediate section of the flexure contracts or expands, i.e., essentially moves in one dimension.

By contrast, embodiments of the spatial flexure of the present invention move not only laterally along a linear longitudinal axis as the flexure contracts or expands, but also moves angularly in that the end section of the flexure (e.g., which may include the reflective member in a spatial flexure scanner) pivots downwardly or upwardly relative to this linear longitudinal axis. This is due to the side segment comprising two quadrilateral-shaped panels each having upper and lower edges that are different in length (e.g., trapezoidal-shaped panels). Because the articulated movement of the various sections, panels, etc., comprising embodiments of the flexure of the present invention is constrained, for example, by the connecting hinge-like pleats at the edges connecting the various sections, panels, etc., contraction and expansion of the intermediate section causes the end section to move not only laterally along a linear longitudinal axis, but to also pivot upwardly or downwardly relative to that linear longitudinal axis. In other words, embodiments of the flexure of the present invention may move a reflective member in two dimensions with a three-dimensional flexure motion, e.g., provide a two-dimensional scanner constrained by a three-dimensional spatial flexure.

In the embodiments of the two-dimensional spatial flexures of the present invention, this pivotal movement is thus coupled to the lateral translational motion or movement imparted by the contraction or expansion of the intermediate section. The particular pivotal angles which may be imparted to the end section (e.g., a scanning beam reflective section having associated therewith a scanning beam reflective surface) will depend upon the particular geometry, size, etc., of the two quadrilateral-shaped panels comprising the side segment, the particular angle at which the common articulated (e.g., hinged-pleat) edge connects these two quadrilateral-shaped panels, etc. In addition, if the angle of the common articulated edge connecting or joining the two quadrilateral-shaped panels is much greater or less than about 90 degrees (i.e., is not orthogonal to the linear longitudinal axis when the intermediate section is fully contracted), undesirable transverse displacement of the end section of the flexure (i.e., relative to the linear longitudinal axis) may occur. For example, where the two-dimensional spatial flexure comprises a side segment having a pair trapezoidal-shaped panels which are connected by a common articulated edge that is orthogonal or essentially orthogonal to the linear longitudinal axis, and when the intermediate section is fully contracted, a lateral translation of 2.4 mm along the linear longitudinal axis to expand the flexure, coupled with only about 7 degrees of pivoting relative to that linear longitudinal axis enables the pair trapezoidal-shaped panels to remain substantially in same vertical plane (encompassing or parallel to the linear longitudinal axis) with minimal or negligible transverse displacement relative to that vertical plane, i.e., the resultant motion of reflective member associated outward face of end section is essentially identical to the idealized motion shown in FIG. 2.

When embodiments of the two-dimensional spatial flexure of the present invention are used with a reflective member as a scanner (i.e., where the reflective member is associated with the outward end of the end section of the flexure to provide a spatial flexure scanner), there is a further integration advantage in that only a single linear, low power, actuator may be required to accomplish the compound motion necessary for stationary CR scanning. For example, the base and end sections of the spatial flexure scanner may be hollow and provided with a linear actuator, for example, a solenoid (e.g., a voice coil), etc., which may be associated with (e.g., positioned within) the flexure, for example, inside the base section of the flexure. (Alternatively, other linear actuators may be used, for example, piezo actuators, lead screw actuators, linear steppers, electrostrictive actuators, shaped memory alloy actuators, etc.) Size savings may alternately be achieved by delivering the scanning beam through embodiments of the hollow spatial flexure the present invention to reflective mirror associated with the end (reflective) section. This small subassembly may provide a relatively small or minimal scanner height (e.g., about 6 mm or less).

Costs may be reduced as the embodiments of the spatial flexure of the present invention may be made, created, formed, etc., for example, as an integral (e.g., monolithic) molded component. If configured for elastic motion or movement, the motion or movement of the embodiments of the spatial flexure of the present invention may be repeatable with molecular precision, thus allowing better performance after calibration compared to, for example, the galvo scanner 100 of FIG. 1. Since the spatial flexure may be actuated by, for example a solenoid (e.g., a voice coil) which is connected with a compliant coupling to the reflective member, for example, by a wire flexure which accommodates the pivoting of the reflective member, expensive bearings may also be avoidable. Other potential advantages for embodiments of the spatial flexure of the present invention may include improved bandwidth, settling time, durability, etc.

Figure 3:
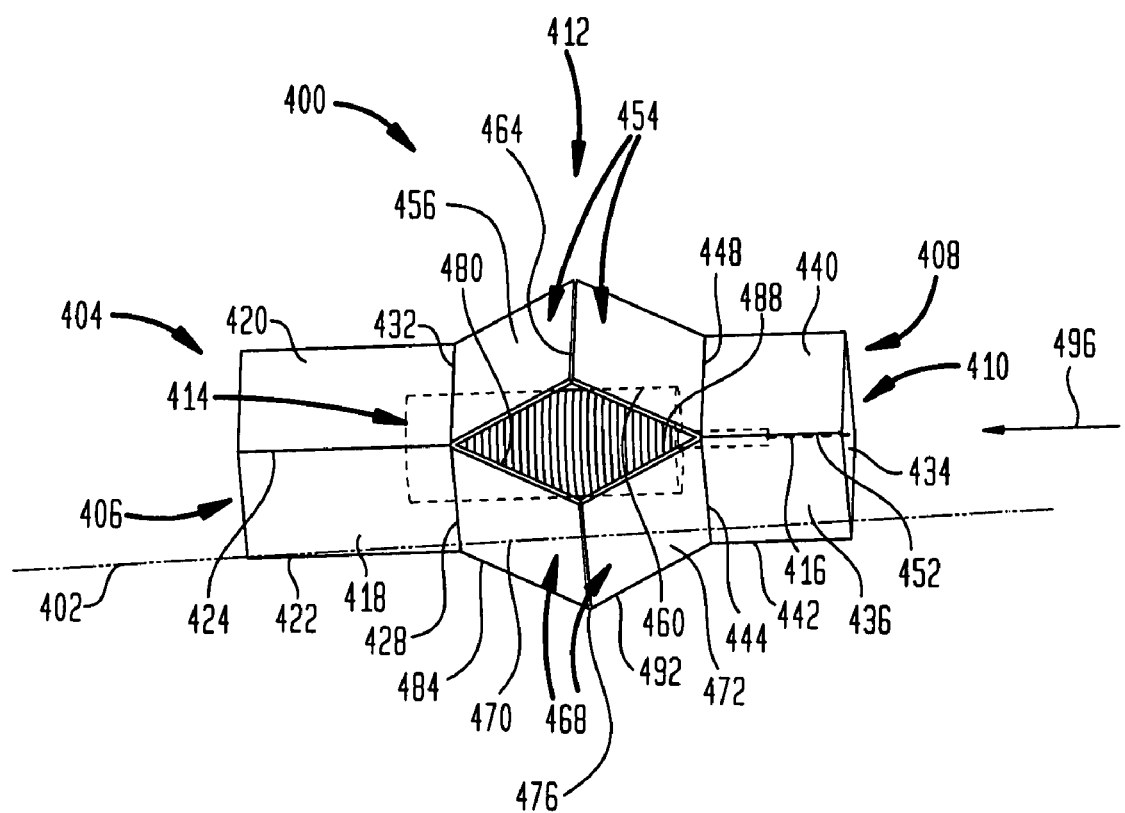
FIG. 3 represents a perspective view of an embodiment of a spatial flexure scanner according to the present invention in a minimally contracted (more expanded) configuration.

FIG. 3 illustrates an embodiment of a spatial flexure according to the present invention which may be integral (e.g., monolithic) and which is shown in a minimally contracted (more expanded) configuration. Referring to FIG. 3, the flexure is indicated generally as 400, and has a linear longitudinal axis indicated by dashed line 402. Flexure 400 may comprise a hollow base section, indicated as 404, having a generally rectangular box-shaped exterior surface and one generally square-shaped end indicated generally as 406, a hollow end or scanning beam reflective section, indicated as 408, having a generally rectangular box-shaped exterior surface, for example, a generally cube-shaped exterior surface as shown in FIG. 3, and one generally square-shaped outward end indicated generally as 410, and an intermediate laterally contracting and expanding section, indicated generally as 412, which connects or joins base section 404 and reflective section 408. For ease of reference as to orientation, configuration, etc., base section 404 may be identified as being the forward or leading section of flexure 400, reflective section 408 as being the end, rearward or trailing section of flexure 400, and the laterally contracting and expanding section 412 as being the middle or intermediate section of flexure 400.

An actuator, for example, a solenoid (e.g., voice coil), indicated generally as 414 and which is shown in FIG. 3 as including a connecting means, for example, a wire flexure 416 which is sufficiently flexible to be pushed, pulled, bent, etc., and which is shown in FIG. 3 as being positioned within base section 404, intermediate section 412 and reflective section 408. Base section 404 comprises a generally rectangular-shaped side panel 418, a generally rectangular-shaped upper panel 420 which may be the same or similar in size as side panel 418, with side panel 418 having a lower edge, indicated as 422. A common edge 424 connects, joins, etc., side panel 418 to upper panel 420. Side panel 418 has a rearward side edge, indicated as 428, while upper panel 420 has an upper rearward edge 432.

A generally square-shaped scanning beam reflective member (e.g., a first surface mirror, a second surface or mangin mirror, a prism, holographic reflector, etc.) which is shown in FIG. 3 in the form of a generally square-shaped scan mirror 434 is positioned and sized to cover outward end 410 of reflective section 408, with one end of wire connector 416 be attached to the back of scan mirror. Reflective section 408 comprises a generally square-shaped side panel 436 and a generally square-shaped upper panel 440 which may be the same or similar in size as side panel 436. Side panel 436 has lower edge, indicated as 442, and a rearward side edge, indicated as 448, while upper panel 440 has an upper rearward edge 452. A common edge 452 connects, joins, etc., side panel 436 to upper panel 440.

Intermediate section 412 comprises an upper segment, indicated generally as 454. Upper segment 454 comprises a forward generally rectangular, for example, a generally square-shaped panel 456, and rearward generally rectangular, for example, generally square-shaped panel 460, which has the same or similar size as forward panel 456. Forward panel 456 and rearward panel 460 are connected by a common edge 464 (for example, a hinged pleat) for articulated movement about a longitudinal axis defined by edge 464. Forward panel 456 is connected to panel 420 by common edge 432 (for example, a hinged pleat) for articulated movement about a longitudinal axis defined by edge 432, while rearward panel 460 is connected to panel 440 by common edge 448 (for example, a hinged pleat) for articulated movement about a longitudinal axis defined by edge 448.

Intermediate section 412 further comprises a side segment, indicated generally as 468. Upper segment 468 comprises a forward quadrilateral-shaped panel, for example, generally trapezoidal-shaped panel 470, and rearward quadrilateral-shaped panel, for example, generally trapezoidal-shaped panel 472 having the same or similar size to forward panel 468. Forward panel 470 and rearward panel 472 are connected by a common edge 476 (for example, a hinged pleat) for articulated movement about a longitudinal axis defined by edge 472. Forward panel 470 is connected to panel 420 by common edge 428 (for example, a hinged pleat) for articulated movement about a longitudinal axis defined by edge 428, while rearward panel 472 is connected to panel 440 by common edge 444 (for example, a hinged pleat) for articulated movement about a longitudinal axis defined by edge 444. Forward panel 470 also has an upper edge 480 which is longer in length than lower edge 484. Rearward panel 472 also has an upper edge 488 which is longer in length than lower edge 492.

In an alternative embodiment, intermediate section 412 of flexure 400 may comprise an additional side segment opposite and symmetrical to side segment comprising corresponding forward and rearward panels 470 and 472. Similarly, intermediate section 412 of flexure 400 may comprise a lower segment opposite to upper segment 454 with corresponding forward and rearward panels similar to panels 456 and 460.

Figure 4:
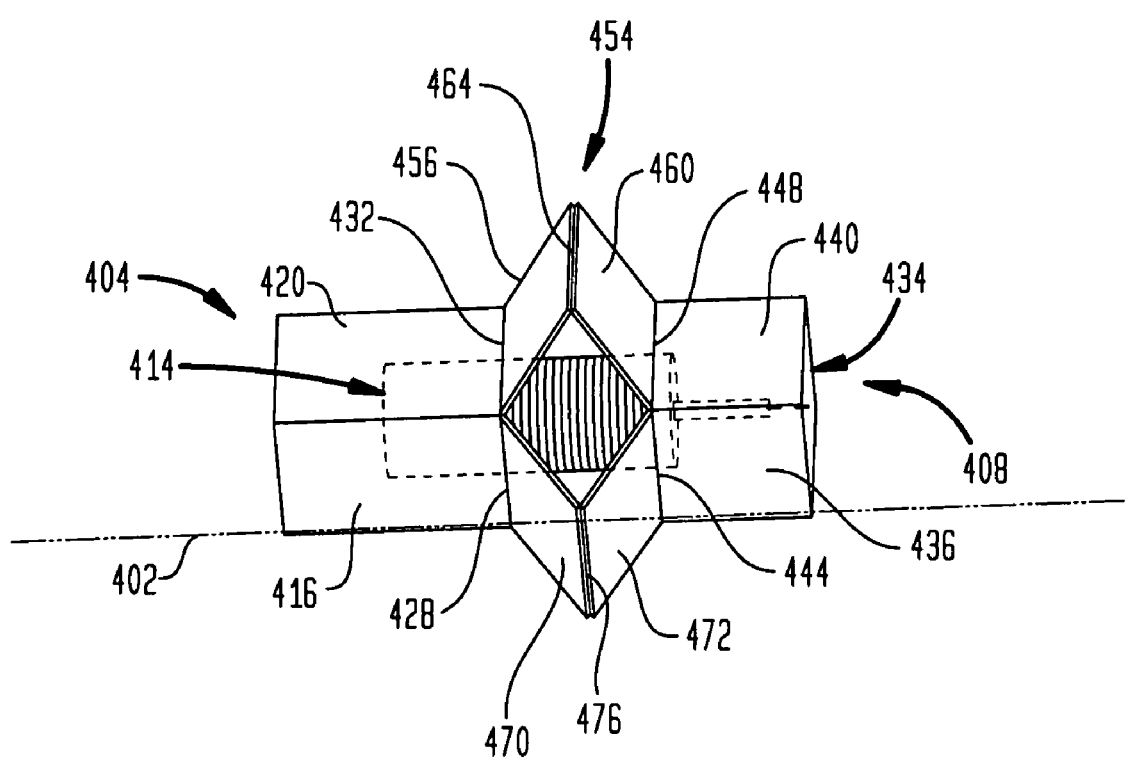
FIG. 4 represents of the embodiment of the scanner of FIG. 3 but in a more contracted (minimally expanded) configuration.

FIG. 4 illustrates flexure 400 of FIG. 3, but in a more contracted (minimally expanded) configuration. As shown in FIG. 4, because of the contraction in length of flexure 404 (due to the contraction of intermediate section 412 because of the articulated movement of forward panel 456 and rearward panel 460 of upper segment 454 and forward panel 470 and rearward panel 472 of side segment 468), scan mirror 434 is translated laterally towards base section 404. As further shown in FIG. 4, lower edge 422 of side panel 418 and lower edge 442 of side panel 436 are essentially aligned with linear longitudinal axis 402. By contrast, as flexure 400 expands in length, as shown in FIG. 3 (due to the expansion of intermediate section 412 because of the articulated movement of forward panel 456 and rearward panel 460 of upper segment 454 and forward panel 470 and rearward panel 472 of side segment 468), scan mirror 434 is translated laterally away from base section 404. In addition, as shown by lower edge 442 being below axis 402, reflective section 408, along with mirror 434, is pivoted angularly downwardly. As also shown in FIG. 3, the scanning beam moves left towards mirror 434 in the direction indicated by arrow 496.

Figure 5:
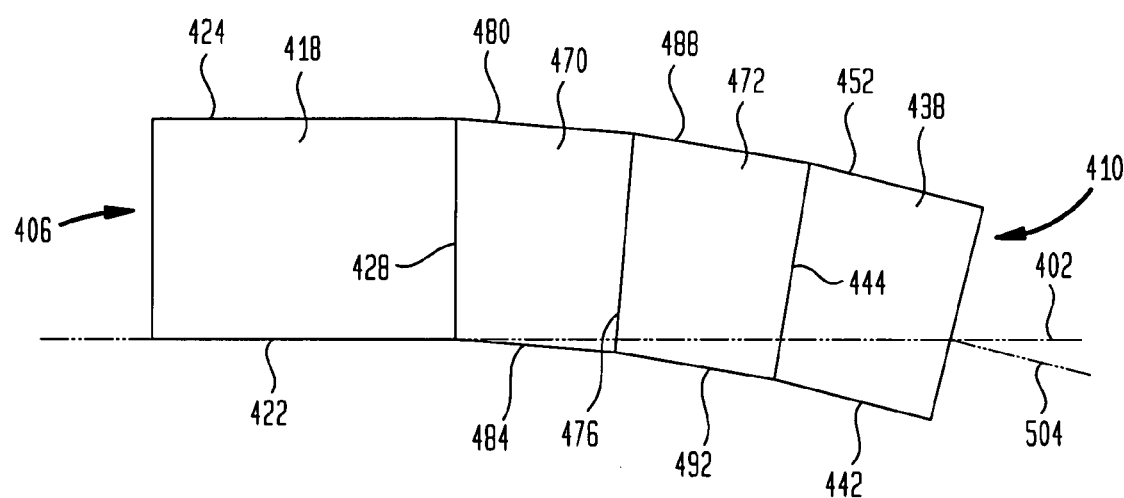
FIG. 5 is side view of the scanner according to the embodiments shown in FIGS. 3 and 4 in a fully expanded (fully uncontracted) configuration.
Figure 6:
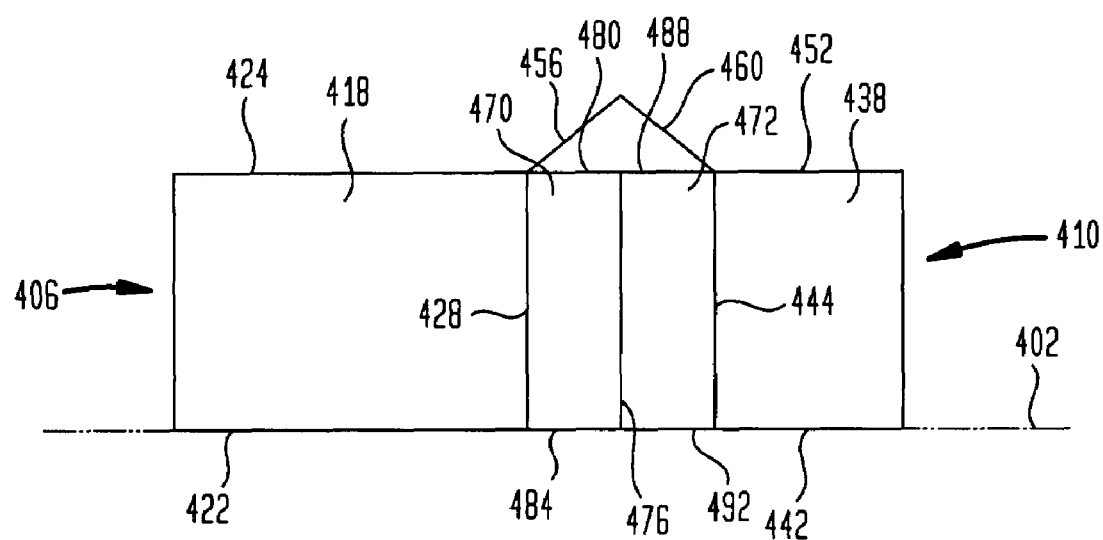
FIG. 6 is side view of the scanner according to the embodiments shown in FIGS. 3 and 4 in a partially contracted (partially unexpanded) configuration.

The movement or motion of the various sections and panels of flexure 400 is further illustrated by FIGS. 5 and 6. FIG. 5 shows flexure 400 in a fully expanded configuration. As shown in FIG. 5, as flexure 400 expands in length (due to the expansion of intermediate section 412), reflective section 408 not only moves laterally away from base section 404, but also pivots angularly relative to linear longitudinal axis 402, as shown by the position of lower edge 442. This is due to upper edges 480 and 488 of respective panels 470 and 472 being longer in length than respective lower edges 484 and 492. The degree to which section 408 pivots when flexure 400 (and intermediate section 412) is fully expanded is illustrated by the angle formed between linear longitudinal axis 402 and the angular pivot axis, indicated as 504 in FIG. 5. As a result scan mirror 434 positioned at end 410 is moved not only laterally away from base section 404 along linear longitudinal axis 402, but also pivoted angularly relative to linear longitudinal axis 402.

By contrast, FIG. 6 shows flexure 400 in a partially contracted configuration. As shown in FIG. 6, panels 456 and 460 of upper segment 454 are flexed or moved upwardly, while panels 470 and 472 of side segment 468 are flexed or moved outwardly away from the vertical plane. In fact, if fully contracted, panels 470 and 472 may abut one another such that only edge 476 would be seen in FIG. 6. In addition, when fully contracted, lower edges 422 of panel, lower edges 484 and 492 of panels 470 and 472, and lower edge 442 of panel 438 would all lie in the same horizontal plane encompassing linear longitudinal axis 402.

As shown in FIG. 3, contraction and expansion of intermediate section 412 may be caused by the combination of the solenoid 414 and wire flexure 416 positioned within base section 404, intermediate section 412 and reflective section 408. As also shown in FIG. 3, one end wire flexure 416 is connected to solenoid 414, with the other end being connected or attached to the back of scan mirror 434. When solenoid 414 is actuated accordingly, wire flexure 416 will pull on scan mirror 434, which, being connected to reflective section 408, will cause reflective section 408 to move laterally towards base section 404, thus causing intermediate section 412 to contract, and reflective section 408 to pivot angularly upward. Conversely, when solenoid 414 is actuated accordingly, wire flexure 416 will push against scan mirror 434, which, being connected to reflective section 408, will cause reflective section 408 move laterally away from base section 404, thus causing intermediate section 412 to expand and reflective section 408 to pivot angularly downward.

Alternatively, and as shown in FIG. 7, the actuator may also be positioned external to flexure 400, for example, in the form of a solenoid indicated generally as 704 having a movable core, indicated generally as 708, within an induction coil, indicated as 712, and a connector, for example, a wire flexure indicated as 716, connected at one end to core 708, and at the other end to scan mirror 434. When solenoid 704 is actuated to cause core 708 to move towards base section 404, scan mirror 434 is also moved towards base section 404 by the pushing of wire flexure 716, thus causing intermediate section 412 to contract, and reflective section 408 to pivot angularly upwards. Conversely, when solenoid 704 is actuated to cause core 708 to move away from base section 404, scan mirror 434 is also pulled away from base section 404 by wire flexure 716, thus causing intermediate section 412 to expand, and reflective section 408 to pivot angularly downwards. As also shown in FIG. 7, the scanning beam moves right (i.e., through hollow base section 404, intermediate section 412 and reflective section 408 of flexure 400) towards scan mirror 434 in the direction indicated by arrow 724.

Embodiments of the spatial flexure scanner of present invention may used in a scanning system, for example, scanning system 200 illustrated in FIG. 2, to provide, for example, a reduced or minimized scanner height, the ability of the scanner to scan entirely on one side of holographic storage medium 204, etc. In such a scanning system, scan mirror 434 of spatial flexure scanner 400 may: (1) provide, for example, a scanning height of about 6 mm or less from upper surface 206 of holographic storage medium 204; (2)

be translated (i.e., by contraction and expansion of intermediate section 412) laterally along linear longitudinal axis 402 of the spatial flexure scanner 400, for example, in the range of from about 1 to about 30 mm; and (3) be pivoted downwardly (i.e., due to side segment 468), for example, up to about 45 degrees relative to linear longitudinal axis 402. These distances and angles may be larger (or smaller), with the flexure size being, for example, a function of scanning beam size, scan range, start angle, flexure material, working distance, etc. The scanning beam may be reflected off either the back surface (i.e., facing towards base section 404) or the front surface (i.e., facing away from base section 404) of scan mirror 434.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device comprising a spatial flexure comprising:
   a base section having:
      an upper edge; and
      a side edge transverse to the upper edge;
   an end section having;
      an upper panel having a first edge, a second edge laterally spaced from the first edge, and a third edge connecting the first and second edges; and
      a side panel having first side edge, a second side edge laterally spaced from the first side edge and having an upper edge connecting the first and second side edges;
      the third edge of upper panel and the upper edge of side panel forming a common edge; and
   an intermediate laterally expanding and contracting section connecting the base and end sections having:
      an upper segment comprising:
         a first generally rectangular-shaped panel having a first edge connected to the upper edge of the base section for articulated movement about a first longitudinal axis; and
         a second generally rectangular-shaped panel having a first edge connected to the first edge of the end section for articulated movement about a second longitudinal axis;
         the first and second rectangular-shaped panels each having a common second edge connected for articulated movement about a third longitudinal axis defined by the common second edge such that the common second edge moves outwardly when the intermediate section laterally contracts and inwardly when the intermediate laterally expands;
      a side segment comprising:
         a first quadrilateral-shaped panel having:
            a lower edge;
            an upper edge different in length from the lower edge of the first quadrilateral-shaped panel;
            a side edge connected to the upper and lower edges of the first quadrilateral-shaped panel, and connected to the side edge of the base section for articulated movement about a fourth longitudinal axis; and
         a second quadrilateral-shaped panel having:
            a lower edge;
            an upper edge different in length from the lower edge of the second quadrilateral-shaped panel; and
            a first side edge connected to the upper and lower edges of the second quadrilateral-shaped panel, and connected to the side edge of the end section for articulated movement about a fifth longitudinal axis;
         the first and second quadrilateral-shaped panels having a common second side edge connected to the respective lower and upper edges of the quadrilateral-shaped panels for articulated movement about a sixth longitudinal axis defined by the common second side edge such that the common second side edge moves outwardly when the intermediate section laterally contracts and inwardly when the intermediate laterally expands;
      whereby: (1) when the intermediate section laterally expands, the end section pivots one of downwardly and upwardly; and (2) when the intermediate section laterally contracts, the end section pivots the other of downwardly and upwardly.

2. The device of claim 1, wherein when the intermediate section laterally expands, the end section pivots downwardly; and wherein when the intermediate section laterally contracts, the end section pivots upwardly.

3. The device of claim 2, wherein the spatial flexure has a linear longitudinal axis along which the intermediate section laterally expands and contracts, and wherein the end section can pivot downwardly up to about 45 degrees relative to the linear longitudinal axis.

4. The device of claim 3, wherein the end section can pivot downwardly up to about 7 degrees relative to the linear longitudinal axis.

5. The device of claim 3, wherein the end section can be translated laterally in the range of from about 1 to about 30 mm.

6. The device of claim 5, wherein the end section can be translated laterally in the range of from about 1 to about 2.4 mm.

7. The device of claim 1, wherein the base section is hollow and wherein the end section is hollow.

8. The device of claim 7, wherein the base section comprises a generally rectangular box-shaped exterior surface having a generally square shaped end, and wherein the end section comprises a generally rectangular box-shaped exterior surface having a generally square-shaped outward end.

9. The device of claim 1, wherein each of the edges defining the first through the sixth longitudinal axes comprises a hinged pleat.

10. The device of claim 1, wherein the spatial flexure has a linear longitudinal axis, and wherein the edge defining the sixth longitudinal axis is orthogonal or essentially orthogonal to the linear longitudinal axis when the intermediate section is fully contracted.

11. A device comprising a spatial flexure scanner comprising:
   a base section having:
      an upper edge; and
      a side edge transverse to the upper edge; and
   a scanning beam reflective section having;
      an upper edge; and
      a side edge transverse to the upper edge of the reflective section; and an intermediate laterally contracting and expanding section connecting the base and reflective sections and having:
  an upper segment comprising:
    a first generally rectangular-shaped panel having a first edge connected to the upper edge of the base section for articulated movement about a first longitudinal axis; and
    a second generally rectangular-shaped panel having a first upper edge connected to the upper edge of the reflective section for articulated movement about a second longitudinal axis;
    the first and second rectangular-shaped panels each having a common second upper edge connected for articulated movement about a third longitudinal axis defined by the common second edge such that the common second edge moves outwardly when the intermediate section laterally contracts and inwardly when the intermediate section laterally expands;
  a side segment comprising:
    a first generally quadrilateral-shaped panel having:
      a lower edge;
      an upper edge different in length from the lower edge of the first quadrilateral-shaped panel;
      a side edge connected to the upper and lower edges of the first quadrilateral-shaped panel, and connected to the side edge of the base section for articulated movement about a fourth longitudinal axis; and
    a second generally quadrilateral-shaped panel having:
      a lower edge;
      an upper edge different in length from the lower edge of the second quadrilateral-shaped panel; and
      a first side edge connected to the upper and lower edges of the second quadrilateral-shaped panel, and connected to the first side edge of the reflective section for articulated movement about a fifth longitudinal axis;
    the first and second quadrilateral-shaped panels having a common second side edge connected to the respective lower first side and second upper edges of the quadrilateral-shaped panels for articulated movement about a sixth longitudinal axis defined by the second common side edge such that the common second side edge moves outwardly when the intermediate section laterally contracts and inwardly when the intermediate section laterally expands;
  an actuator associated with the base section;
  a scanning beam reflective member connected to second edge of the upper panel and second side edge of the side panel of the reflective section;
  means connecting the actuator and the reflective member for causing lateral contraction or expansion of the intermediate section in response to the actuator;
  whereby: (1) when the intermediate section laterally expands, the reflective section pivots downwardly; and (2) when the intermediate section laterally contracts, the reflective section pivots upwardly.

12. The device of claim 11, wherein the actuator comprises a solenoid.

13. The device of claim 12, wherein the actuator comprises a voice coil.

14. The device of claim 11, wherein the connecting means comprises a wire spring connected at one end to the solenoid and at the other end to the reflective member.

15. The device of claim 14, wherein the base section is hollow, wherein the reflective section is hollow, wherein the solenoid and wire flexure are is positioned within the spatial flexure, and wherein the intermediate section contracts and expands due to pulling or pushing on the wire flexure by the solenoid.

16. The device of claim 15, wherein the base section comprises a generally rectangular box-shaped exterior surface having a generally square shaped end, and wherein the reflective section comprises a generally rectangular box shaped exterior surface having a generally square-shaped outward end to which the reflective member is connected.

17. The device of claim 11, wherein when the intermediate section laterally expands, the reflective section pivots one of downwardly; and wherein when the intermediate section laterally contracts, the reflective section pivots upwardly.

18. The device of claim 17, wherein the spatial flexure has a linear longitudinal axis along which the intermediate section laterally expands contracts, and wherein the reflective section can pivot downwardly up to about 45 degrees relative to the linear longitudinal axis.

19. The device of claim 18, wherein the reflective section can be translated laterally in the range of from about 1 to about 30 mm.

20. The device of claim 11, wherein each of the edges defining the first through the sixth longitudinal axes comprises a hinged pleat.

21. The device of claim 11, wherein the spatial flexure scanner has a linear longitudinal axis, and wherein the edge defining the sixth longitudinal axis is essentially orthogonal to the orthogonal or essentially orthogonal to the linear longitudinal axis when the intermediate section is fully contracted.

22. The device of claim 11, wherein the reflective member comprises a scan mirror.

23. A scanning system comprising the spatial flexure scanner of claim 11, wherein the reflective member: (1) provides a scanning height of about 6 mm or less above an upper surface of a holographic storage medium: (2) can be translated laterally along a linear longitudinal axis of the spatial flexure scanner in the range of from about 1 to about 30 mm; and (3) can be pivoted downwardly or upwardly up to about 45 degrees relative to the linear longitudinal axis.

24. A scanning system of claim 23, wherein the reflective member comprises a scan mirror.

25. A device comprising a spatial flexure comprising:
  a base section having:
    an upper edge; and
    a side edge transverse to the upper edge; and
  an end section having;
    an upper panel having a first edge, a second edge laterally spaced from the first edge, and a third edge connecting the first and second edges; and
    a side panel having first side edge, a second side edge laterally spaced from the first side edge and having an upper edge connecting the first and second side edges;
    the third edge of upper panel and the upper edge of side panel forming a common edge; and
  an intermediate laterally contracting and expanding section connecting the base and end sections and having:
    an upper segment comprising:

an first generally square-shaped panel having a first edge connected to the upper edge of the base section for articulated movement about a first longitudinal axis; and a second generally square-shaped panel having a first edge connected to the first edge of the end section for articulated movement about a second longitudinal axis;

the first and second square-shaped panels each having a common second upper edge connected for articulated movement about a third longitudinal axis defined by the common second edge such that the common second edge moves outwardly when the intermediate section laterally contracts and inwardly when the intermediate section laterally expands;

a side segment comprising:
a first trapezoidal-shaped panel having:
a lower edge;
an upper edge longer in length than the lower edge of the first quadrilateral-shaped panel;
a side edge connected to the upper and lower edges of the first trapezoidal-shaped panel, and connected to the side edge of the base section for articulated movement about a fourth longitudinal axis; and a second generally trapezoidal-shaped panels having:
a lower edge;
an upper edge longer in length than the lower edge of the second trapezoidal-shaped panel; and
a first side edge connected to the upper and lower edges of the second trapezoidal-shaped panel, and connected to the side edge of the end section for articulated movement about a fifth longitudinal axis;

the first and second trapezoidal-shaped panels having a common second side edge connected to the respective lower side and upper edges of the trapezoidal-shaped panels for articulated movement about a sixth longitudinal axis defined by the common second side edge such that the common second side edge moves outwardly when the intermediate section laterally contracts and inwardly when the intermediate section laterally expands;

whereby: (1) when the intermediate section laterally expands, the end section pivots downwardly; and (2) when the intermediate section laterally contracts, the end section pivots upwardly.

26. The device of claim 25, wherein the spatial flexure has a linear longitudinal axis along which the intermediate section laterally expands contracts, and wherein the end section can pivot downwardly up to about 45 degrees relative to the linear longitudinal axis.

27. The device of claim 26, wherein the end section can be translated laterally in the range of from about 1 to about 30 mm.

28. The device of claim 25, wherein the base section is hollow and wherein the end section is hollow.

29. The device of claim 28, wherein the base section comprises a generally rectangular box-shaped exterior surface having a generally square shaped end, and wherein the end section comprises a generally rectangular box shaped exterior surface having a generally square-shaped outward end.

30. The device of claim 25, wherein each of the edges defining the first through the sixth longitudinal axes comprises a hinged pleat.

31. The device of claim 25, wherein the spatial flexure has a linear longitudinal axis, and wherein the edge defining the sixth longitudinal axis is essentially orthogonal to the orthogonal or essentially orthogonal to the linear longitudinal axis when the intermediate section is fully contracted.

32. A device comprising a spatial flexure scanner comprising:
a base section having:
an upper edge; and
a side edge transverse to the upper edge; and
a scanning beam reflective section having;
an upper edge; and
a side edge transverse to the upper edge of the reflective section; and an intermediate laterally expanding and contracting section connecting the base and reflective sections and having:
an upper segment comprising:
an first generally square-shaped panel having a first edge connected to the upper edge of the base section for articulated movement about a first longitudinal axis; and
a second generally square-shaped panel having a first upper edge connected to the upper edge of the reflective section for articulated movement about a second longitudinal axis;

the first and second square-shaped panels each having a common second upper edge connected for articulated movement about a third longitudinal axis defined by the common second edge such that the common second edge moves outwardly when the intermediate section laterally contracts and inwardly when the intermediate section laterally expands;

a side segment comprising:
a first generally trapezoidal-shaped panel having:
a lower edge;
an upper edge longer in length than the lower edge of the first trapezoidal-shaped panel;
a side edge connected to the upper and lower edges of the first trapezoidal-shaped panel, and connected to the side edge of the base section for articulated movement about a fourth longitudinal axis; and a second generally trapezoidal-shaped panel having:
a lower edge;
an upper edge longer in length than the lower edge of the second trapezoidal-shaped panel; and
a first side edge connected to the upper and lower edges of the second trapezoidal-shaped panel, and connected to the first side edge of the reflective section for articulated movement about a fifth longitudinal axis;

the first and second trapezoidal-shaped panels having a common second side edge connected to the respective lower first side and second upper edges of the trapezoidal-shaped panels for articulated movement about a sixth longitudinal axis defined by the second common side edge such that the common second side edge moves outwardly when the intermediate section laterally contracts and inwardly when the intermediate section laterally expands;

an actuator;

a scanning beam reflective member connected to second edge of the upper panel and second side edge of the side panel of the reflective section;

means connecting the actuator and the reflective member for causing lateral contraction or expansion of the intermediate section in response to the actuator;

whereby: (1) when the intermediate section laterally expands, the reflective section pivots downwardly; and (2) when the intermediate section laterally contracts, the reflective section pivots upwardly.

33. The device of claim 32, wherein the actuator comprises a solenoid.

34. The device of claim 33, wherein the actuator comprises a voice coil.

35. The device of claim 33, wherein the connecting means comprises a wire flexure connected at one end to the solenoid and at the other end to the reflective member.

36. The device of claim 35, wherein the base section is hollow, wherein the reflective section is hollow, wherein the solenoid and wire flexure are positioned within the spatial flexure, and wherein the intermediate section contracts and expands due to pulling or pushing on the wire flexure by the solenoid.

37. The device of claim 36, wherein the solenoid and wire flexure are external to the base, intermediate and reflective sections.

38. The device of claim 37, wherein the base section comprises a generally rectangular box-shaped exterior surface having a generally square shaped end, and wherein the reflective section comprises a generally rectangular box shaped exterior surface having a generally square-shaped outward end to which the reflective member is connected.

39. The device of claim 35, wherein when the intermediate section laterally expands, the reflective section pivots one of downwardly; and wherein when the intermediate section laterally contracts, the reflective section pivots upwardly.

40. The device of claim 32, wherein the spatial flexure has a linear longitudinal axis along which the intermediate section laterally expands contracts, and wherein the reflective section can pivot downwardly up to about 45 degrees relative to the linear longitudinal axis.

41. The device of claim 40, wherein the reflective section can be translated laterally in the range of from about 1 to about 30 mm.

42. The device of claim 32, wherein the reflective member comprises a scan mirror.

43. The device of claim 32, wherein each of the edges defining the first through the sixth longitudinal axes comprises a hinged pleat.

44. The device of claim 32, wherein the spatial flexure scanner has a linear longitudinal axis, and wherein the edge defining the sixth longitudinal axis is essentially orthogonal to the orthogonal or essentially orthogonal to the linear longitudinal axis when the intermediate section is fully contracted.

45. A scanning system comprising the spatial flexure scanner of claim 32, wherein the reflective member: (1) provides a scanning height of about 6 mm or less above an upper surface of a holographic storage medium: (2) can be translated laterally along a linear longitudinal axis of the spatial flexure scanner in the range of from about 1 to about 30 mm; and (3) can be pivoted downwardly or upwardly up to about 45 degrees relative to the linear longitudinal axis.

46. A scanning system of claim 45, wherein the reflective member comprises scan mirror.

* * * * *

UNITED STATES PATENT AND TRADEMARK OFFICE
CERTIFICATE OF CORRECTION

PATENT NO. : 7,336,409 B2
APPLICATION NO. : 11/714126
DATED : February 26, 2008
INVENTOR(S) : Bradley J. Sissom Page 1 of 1

It is certified that error appears in the above-identified patent and that said Letters Patent is hereby corrected as shown below:

Column 8,
Line 36, "an" should read --a--.

Column 3,
Line 55, "t" should be deleted.

Column 5,
Line 44, "an" should read --a--.

Column 6,
Line 44, "an" should read --a--.

Column 20,
Line 38, "claim 11" should read --claim 1--.

Signed and Sealed this

Third Day of June, 2008

JON W. DUDAS
*Director of the United States Patent and Trademark Office*